United States Patent
Farhat et al.

(10) Patent No.: US 10,377,409 B2
(45) Date of Patent: Aug. 13, 2019

(54) ENHANCED VEHICLE STEERING

(71) Applicant: Ford Global Technologies, LLC, Dearborn, MI (US)

(72) Inventors: Mohamad Wajih Issam Farhat, Dearborn, MI (US); Domenic Miccinilli, Royal Oak, MI (US); Jens Christiansen, Plymouth, MI (US); Nathaniel Abram Rolfes, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/679,251

(22) Filed: Aug. 17, 2017

(65) Prior Publication Data

US 2019/0054950 A1  Feb. 21, 2019

(51) Int. Cl.
*B62D 1/28* (2006.01)
*B62D 6/10* (2006.01)
*G05D 1/00* (2006.01)

(52) U.S. Cl.
CPC ............ *B62D 1/286* (2013.01); *B62D 6/10* (2013.01); *G05D 1/0061* (2013.01); *G05D 1/0088* (2013.01); *G05D 2201/0213* (2013.01)

(58) Field of Classification Search
CPC ........ B62D 1/286; B62D 6/10; G05D 1/0061; G05D 1/0088; G05D 2201/0213
See application file for complete search history.

(56) References Cited

U.S. PATENT DOCUMENTS

| | | | | |
|---|---|---|---|---|
| 5,485,378 A | * | 1/1996 | Franke | B62D 15/025 348/118 |
| 5,602,735 A | * | 2/1997 | Wada | B62D 5/0436 180/446 |
| 5,992,558 A | * | 11/1999 | Noro | B62D 6/007 180/446 |
| 6,170,600 B1 | * | 1/2001 | Shimizu | B62D 1/28 180/446 |
| 6,259,980 B1 | * | 7/2001 | Peck | B60T 7/12 701/24 |
| 8,433,470 B1 | | 4/2013 | Szybalski et al. | |
| 9,051,006 B2 | | 6/2015 | Reed et al. | |
| 9,771,101 B2 | * | 9/2017 | Mitsumoto | B62D 1/286 |
| 9,796,412 B2 | * | 10/2017 | Sakaguchi | B62D 5/0463 |
| 9,919,733 B2 | * | 3/2018 | Minaki | B62D 5/04 |
| 10,131,377 B2 | * | 11/2018 | Minaki | B62D 5/0463 |
| 10,167,014 B2 | * | 1/2019 | Maeda | B62D 6/008 |

(Continued)

FOREIGN PATENT DOCUMENTS

CN  105711591 A  6/2016

OTHER PUBLICATIONS

Bodell, O., "Teleoperation of Autonomous Vehicle", Chalmers University of Technology, 2016 (70 pages).

*Primary Examiner* — Behrang Badii
*Assistant Examiner* — Daniel L Greene
(74) *Attorney, Agent, or Firm* — Frank A. MacKenzie; Bejin Bieneman PLC (57) ABSTRACT

A manual steering torque input is measured. A manual steering mode of a vehicle is actuated when the manual steering torque input is below a first torque threshold and above a second torque threshold for longer than a time threshold that is based on a vehicle speed.

20 Claims, 3 Drawing Sheets

(56) References Cited

U.S. PATENT DOCUMENTS

| | | | |
|---|---|---|---|
| 2006/0060412 A1* | 3/2006 | Bolourchi | B62D 5/008 180/443 |
| 2012/0109416 A1* | 5/2012 | Mizutani | B60T 8/17557 701/1 |
| 2015/0120142 A1 | 4/2015 | Park et al. | |
| 2015/0353125 A1* | 12/2015 | Tsubaki | B62D 1/286 701/42 |
| 2016/0202700 A1 | 6/2016 | Sprigg | |
| 2016/0207538 A1 | 7/2016 | Urano et al. | |

\* cited by examiner

ENHANCED VEHICLE STEERING

BACKGROUND

Vehicles can travel along roadways that are typically shared by other vehicles. Autonomous or semi-autonomous vehicles, i.e., vehicles that operate wholly or at least partly, without intervention of a human operator, can adjust their speed and distance from other vehicles based on the position of the other vehicles. However, systems are lacking for dynamically shifting between autonomous and manual modes of operation of vehicle components based on user input that differs from the autonomous vehicle's operation and the current state of the vehicle, e.g., a current vehicle speed, a current vehicle trajectory, etc.

DETAILED DESCRIPTION

A system includes a computer programmed to measure a manual steering torque input and actuate a manual steering mode of a vehicle when the manual steering torque input is below a first torque threshold and above a second torque threshold for longer than a time threshold that is based on a vehicle speed.

The computer can be further programmed to actuate the manual steering mode when the manual steering torque input is above the first torque threshold. The computer can be further programmed to remain in the manual steering mode until the vehicle is deactivated.

The computer can be further programmed to actuate an autonomous steering mode upon receiving user input.

The computer can be further programmed to actuate an autonomous steering mode upon operating in the manual steering mode for longer than a second time threshold. The computer can be further programmed to determine a second vehicle speed and to determine the second time threshold based on the second vehicle speed.

The computer can be further programmed to determine a second manual steering torque input in the manual steering mode and to actuate an autonomous steering mode when the second manual steering torque input is below the second torque threshold for longer than a second time threshold.

The computer can be further programmed to determine a second manual steering torque input in the manual steering mode and to actuate an autonomous steering mode when the second manual steering torque input is below a third torque threshold for longer than a second time threshold.

The computer can be further programmed to determine at least one of the first torque threshold and the second torque threshold based on the vehicle speed.

The computer can be further programmed to identify the manual steering torque input based on user input to a steering wheel.

A method includes measuring a manual steering torque input and actuating a manual steering mode of a vehicle when the manual steering torque input is below a first torque threshold and above a second torque threshold for longer than a time threshold that is based on a vehicle speed.

The method can further include actuating the manual steering mode when the manual steering torque input is above the first torque threshold. The method can further include remaining in the manual steering mode until the vehicle is deactivated.

The method can further include actuating an autonomous steering mode upon receiving user input.

The method can further include actuating an autonomous steering mode upon operating in the manual steering mode for longer than a second time threshold. The method can further include determining a second vehicle speed and determining the second time threshold based on the second vehicle speed.

The method can further include determining a second manual steering torque input in the manual steering mode and actuating an autonomous steering mode when the second manual steering torque input is below the second torque threshold for longer than a second time threshold.

The method can further include determining a second manual steering torque input in the manual steering mode and actuating an autonomous steering mode when the second manual steering torque input is below a third torque threshold for longer than a second time threshold.

The method can further include determining at least one of the first torque threshold and the second torque threshold based on the vehicle speed.

The method can further include identifying the manual steering torque input based on user input to a steering wheel.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A user of a vehicle that is being operated without user input, i.e., autonomously (sometimes referred to herein as a host vehicle), may want to temporarily take control of vehicle steering. For example, if the autonomous vehicle is behind a target vehicle that is moving relatively slowly, the user may want to steer around the target vehicle to pass the target vehicle. A computer in the host vehicle can measure a manual steer torque input applied by the user to the steering component, e.g., a pinion of a rack-and-pinion steering component. Based on the manual steer torque input, the computer can predict that the user intends to operate the steering in a manual mode for a remainder of a route or that the user intends to temporarily assume manual control and to return the steering to an autonomous mode once a maneuver is completed.

The prediction of user intent can be made as follows. The computer can determine a first torque threshold and a second torque threshold that is lower than the first torque threshold, as described below. The computer can determine a time threshold based on a current vehicle speed. When the manual steering torque input is above the first torque threshold, the computer can operate the steering component in the manual mode, returning manual control of the steering to the user. When the manual steering torque input is above the second torque threshold and below the second torque threshold, the computer can determine a time elapsed from the manual steer torque input exceeding the second threshold. If the time elapsed is greater than the time threshold, the computer operates the steering in the manual mode for the remainder of the route. Otherwise, the computer returns the steering to the autonomous mode once the manual steering torque input falls below the second torque threshold.

Figure 1:
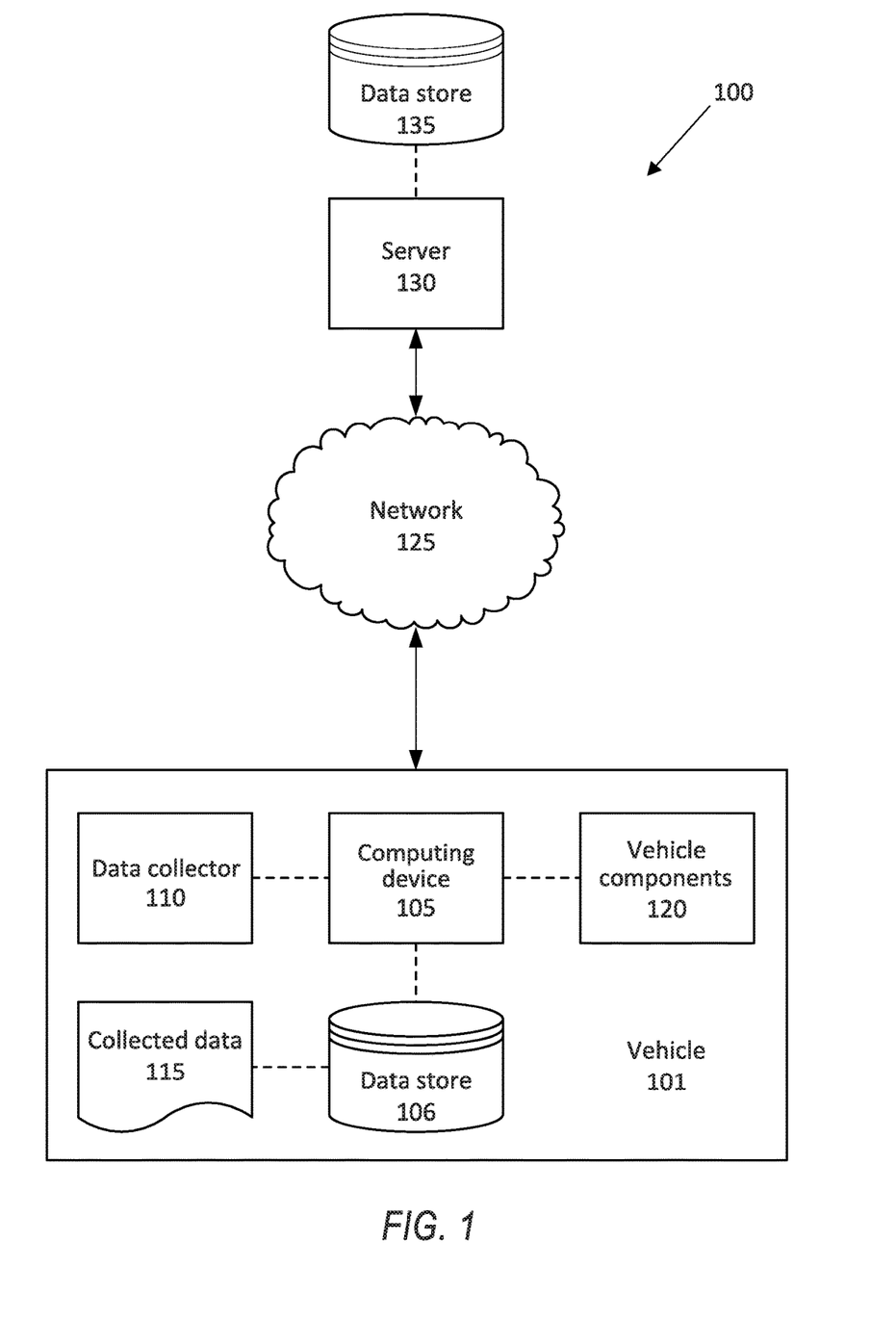
FIG. 1 is a block diagram of an example system for adjusting vehicle steering.

FIG. 1 illustrates an example system 100 for adjusting a steering mode of a vehicle 101 (sometimes referred to as a host vehicle 101). A computer 105 in the vehicle 101 is programmed to receive collected data 115 from one or more sensors 110. For example, vehicle 101 data 115 may include a location of the vehicle 101, a location of a target (i.e., object outside of the vehicle 101 such as another vehicle), etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steeling rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The computer 105 can operate the steering 120 in one of an autonomous mode and a manual mode. When the steering 120 is in the autonomous mode (i.e., an autonomous steering mode), the computer 105 operates the steering 120 and ignores input from the user. When the steering 120 is in the manual mode (i.e., a manual steering mode), the computer 105 does not provide input to the steering 120, allowing user input to control the steering 120. When the steering 120 is in the manual mode, the computer 105 can provide input to the steering for assistance to the user, e.g., power steering, lane-keeping, etc., but the steering 120 will follow the user input when input from the computer 105 conflicts with the user input. The computer 105 can shift from the autonomous steeling mode to the manual steeling mode based on a manual steeling torque input, as described below, from the user. The computer 105 can shift from the manual steering mode to the autonomous steering mode based on the manual steering torque input, as described below.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
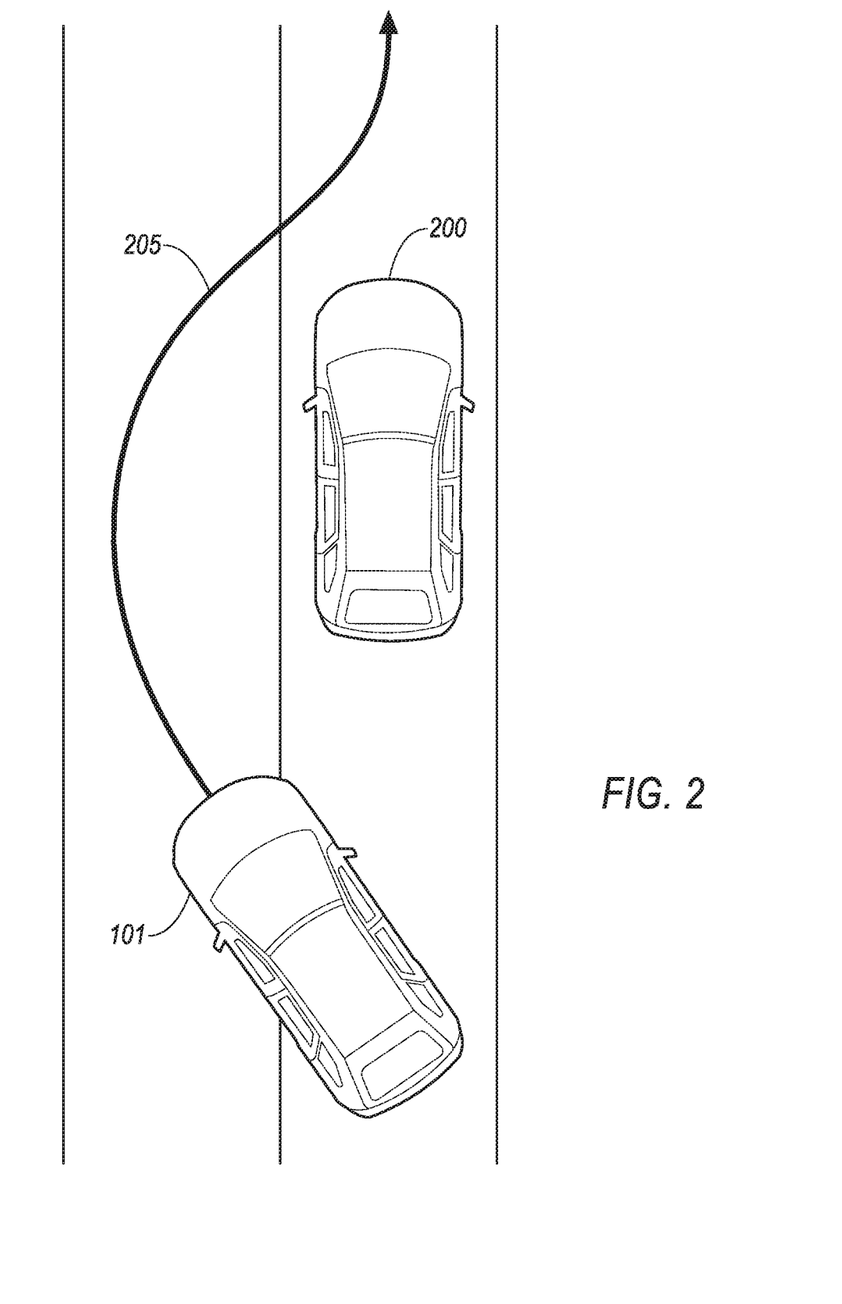
FIG. 2 illustrates a host vehicle steering around a target vehicle.

FIG. 2 illustrates an example vehicle 101 shifting to the manual steering mode. When in a fully autonomous mode, the user in the vehicle 101 may want to provide a manual steering input. For example, as shown in FIG. 2, the vehicle 101 can be behind a slower target vehicle 200, and the user can decide to pass the target vehicle 200. Alternatively, the user can decide to provide the manual steering input to avoid an object in the roadway. The user can move the vehicle 101 along a path 205, e.g., into an adjacent roadway lane to avoid the target vehicle 200 and then back into the original roadway lane. The path 205 as shown in FIG. 2 shows a user-intended path 205 along which to move the vehicle 101 to pass the target vehicle 200. The path 205 shows the vehicle 101 moving into the adjacent roadway lane and returning to the original roadway lane in front of the target vehicle 200. Upon returning to the original roadway lane, the computer 105 can predict that the user intends to return the steering 120 to the fully autonomous mode.

The computer 105 can be programmed to determine the manual steering torque input. The computer 105 can communicate with one or more sensors 110 over the network 125. For example, the computer 105 can communicate with a sensor 110 on a pinion that is a part of a steering 120 rack-and-pinion system. When the user provides a manual steering input, the sensor 110 on the pinion can detect a change in a torque applied to the pinion. The sensor 110 can collect data 115 about the change in the torque and send the data 115 to the computer 105 over the network 125. The computer 105 can determine the manual steering torque input form the data 115.

The computer 105 can be programmed to compare the manual steering torque input to a first threshold. The first threshold can be a predetermined value stored in the data store 106 and/or the server 130. Alternatively, the first threshold can be based on one or more vehicle 101 parameters, e.g., a speed, a trajectory, a distance to the target vehicle 200, etc. For example, the first threshold can be a function (e.g., a weighted sum, a weighed product, an exponential, etc.) of the vehicle 101 speed and the distance to the target vehicle 200, and the first threshold can decrease as the vehicle 101 speed increases and the distance to the target vehicle 200 decreases. That is, as the vehicle 101 speed increases and the distance to the target vehicle 200 decreases, the torque input necessary to return to the manual steering mode decreases. The first threshold can be determined as a torque value that indicates that the user intends to manually steer the vehicle 101 until deactivation of the vehicle 101, i.e., the user wants to operate the vehicle 101 in the manual steering mode and to remain in the manual steering mode. That is, the first threshold can be selected as a torque value predicting that the user intends to remain in the manual steering mode for the remainder of the route. When the manual steering torque input exceeds the first threshold, the computer 105 can be programmed to operate the steering 120 in the manual steering mode.

The computer 105 can be programmed to compare the manual steering torque input to a second threshold. The second threshold is lower than the first threshold. The second threshold can be a predetermined value stored in the data store 106 and/or the server 130. Alternatively, the second threshold can be based on one or more vehicle 101 parameters, e.g., a speed, a trajectory, a distance to the target vehicle 200, etc. For example, the second threshold can be a function (e.g., a weighted sum, a weighed product, an exponential, etc.) of the vehicle 101 speed and the distance to the target vehicle 200, and the second threshold can decrease as the vehicle 101 speed increases and the distance to the target vehicle 200 decreases. That is, as the vehicle 101 speed increases and the distance to the target vehicle 200 decreases, the torque input necessary to temporarily return to the manual steering mode decreases. The second threshold can be determined as a torque value that indicates that the user intends temporarily to steer the vehicle 101 manually and then return the vehicle 101 to the autonomous steering mode. When the manual steering torque input is above the second threshold but below the first threshold, the computer 105 can determine to operate the steeling 120 in the manual steering mode when the manual steering torque input exceeds the second threshold for longer than a time threshold. For example, the computer 105 can store a look-up table such as Table 1 below that proscribes the first and second thresholds:

TABLE 1

| Torque Thresholds | |
|---|---|
| First Threshold (N-m) | 6.0 |
| Second Threshold (N-m) | 3.3 |

The first and second thresholds can be determined to predict an intended operation of the steering 120. For example, as described above, the first and second thresholds can be determined to permanently shift to the manual steering mode when the manual steering torque input is above the first threshold and to temporarily shift to the manual steering mode when the manual steering torque input is above the second threshold but below the first threshold. In another example, the computer 105 can be programmed not to shift to the manual steering mode at all, and the first and second thresholds can be determined as values higher than the operator is capable of applying torque input. In another example, the computer 105 can be programmed to only allow the steering 120 to shift from the autonomous steering mode to the manual steering mode, and not to return to the autonomous steering mode, and the second threshold can be higher than the first threshold. In another example, the first threshold can be a value higher than a possible operator steering input, preventing the computer 105 from permanently shifting to the manual mode (i.e., the steering 120 can always return to the autonomous mode when the steering torque input is below the second threshold).

The computer 105 can be programmed to compare the manual steering torque input to a third threshold. The third threshold is lower than the second threshold. When the steering 120 is in the manual mode, and the manual steering torque input is below the third threshold, the computer 105 can be programmed to shift to the autonomous steering mode. The third threshold can be a predetermined value, e.g., 1 N-m. The computer 105 can be programmed to shift to the manual mode when the manual steering torque input is between the second threshold and the first threshold, and, once in the manual mode, can be programmed to return to the autonomous mode when the manual steering torque input is below the third threshold.

The computer 105 can measure a time elapsed from detection of the manual steering torque input above the second threshold. When the computer 105 determines that the manual steering torque input is above the second threshold but is below the first threshold, the computer 105 can record a timestamp at the time of detecting the manual steering torque input. The computer 105 can then measure a time elapsed from the timestamp. When the time elapsed from the timestamp is above the time threshold, the computer 105 can operate the steering 120 in the manual mode. If the manual steering torque input falls below the second threshold and the time elapsed is less than the time threshold, the computer 105 can operate the steering 120 in the fully autonomous mode upon detecting the manual steering torque input below the second threshold.

The computer 105 can be programmed to actuate the autonomous steering mode when a time elapsed in the manual steering mode exceeds a second time threshold. When the operator determines to temporarily assert manual control of the steering 120, the computer 105 can determine to return to the autonomous steering mode after the second time threshold has elapsed. The second time threshold can be based on the vehicle 101 speed, as described below. Alternatively or additionally, the computer 105 can be programmed to actuate the autonomous steering mode when a time elapsed in the manual steering mode exceeds a third time threshold (e.g. 400 ms) and the manual steeling torque input is below the third threshold for the elapsed time.

The time threshold and the second time threshold can be based on a vehicle 101 speed. The computer 105 can be programmed to measure the speed of the vehicle 101 from, e.g., a speed sensor 110. Based on the speed, the computer 105 can determine the time threshold and the second time threshold. For example, the computer 105 can store a look-up table such as Table 2 below that proscribes a time threshold and a second time threshold for a specific speed and/or speed range:

TABLE 2

Time Thresholds Based on Vehicle Speed

| Vehicle speed (kph) | Time threshold (ms) | Second time threshold (ms) |
|---|---|---|
| 0-25 | 400 | 40 |
| 25-40 | 320 | 40 |
| 40-60 | 240 | 40 |
| 60-100 | 240 | 20 |
| 100-160 | 240 | 20 |
| >160 | 160 | 20 |

Alternatively, the time threshold can be based on a function with an input of vehicle speed and an output of a time:

$$t_{thresh} = C \operatorname{arccot}(v) + t_{sample} \quad (1)$$

where $t_{thresh}$ is the time threshold, v is the vehicle 101 speed, C is a constant based on a maximum value for the time threshold, arccot is the arccotangent function (i.e., the inverse of the cotangent trigonometric function), and $t_{sample}$ is a sample time of a sensor 110 or component 120, e.g., a vehicle 101 ECU. In another example, the function can be, e.g., a sigmoid function, a logistic function, another trigonometric function, a linear function, a combination of the previously listed example functions, etc.

Figure 3:
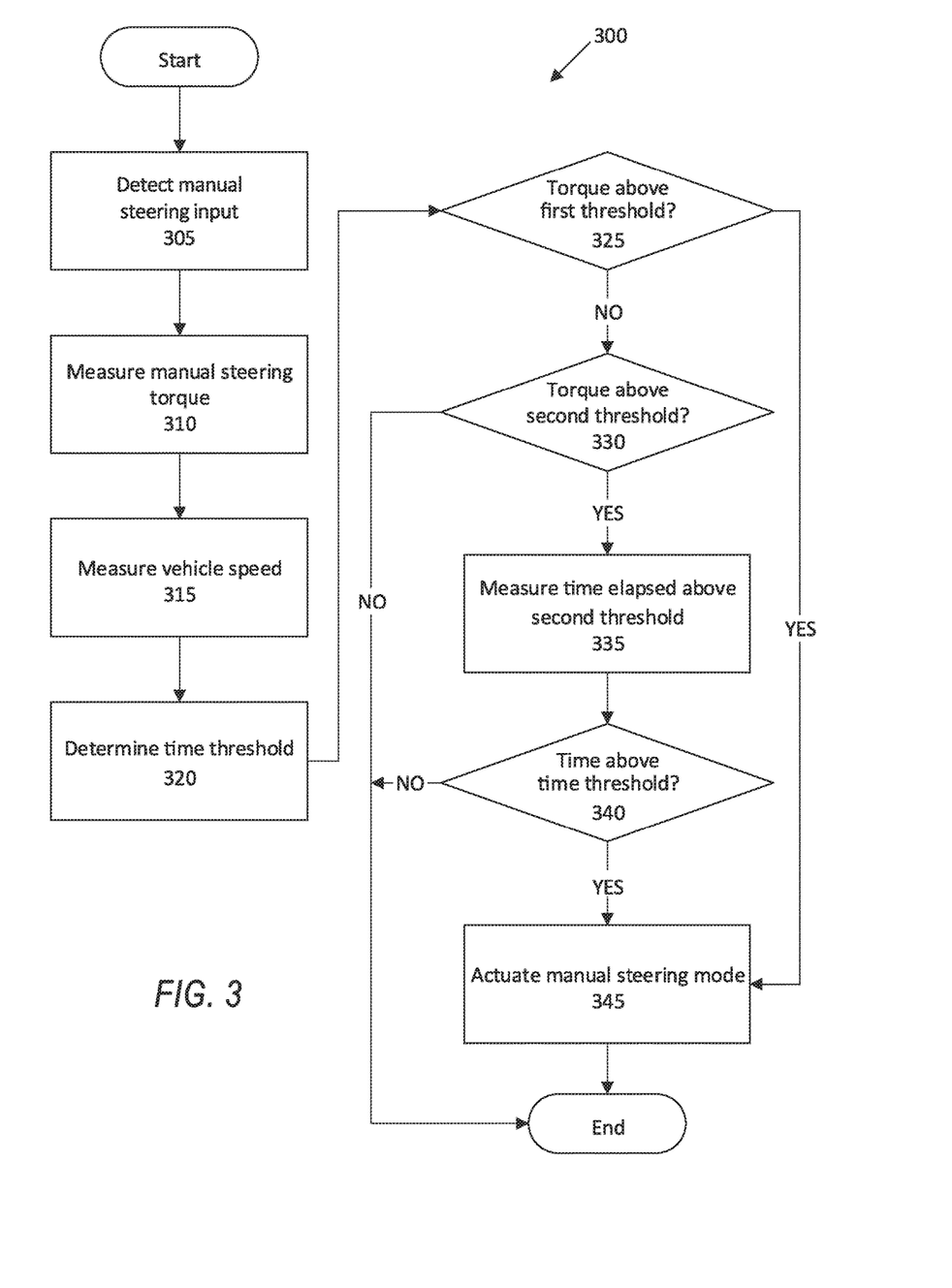
FIG. 3 is a flow diagram of an example process for adjusting vehicle steering of the vehicle.

FIG. 3 illustrates an example process 300 for adjusting a steering 120 based on a manual steering torque input. The process 300 begins in a block 305, in which the computer 105 detects a manual steering input. As described above, the computer 105 can receive data 115 from a sensor 110 on a steering pinion indicating user input to a steering wheel.

Next, in a block 310, the computer 105 determines the manual steering torque input based on the data 115 from the sensor 110. The sensor 110 can collect data 115 about a force applied to the steering pinion, and the computer 105 can determine a steering torque based on the force applied to the steering pinion.

Next, in a block 315, the computer 105 determines a vehicle 101 speed. The computer 105 can actuate one or more sensors 110, e.g., a speed sensor 110, to determine the current vehicle 101 speed.

Next, in a block 320, the computer 105 determines a time threshold based on the vehicle 101 speed. As described above, the time threshold can be inversely proportional to the vehicle 101 speed. For example, the time threshold can be a minimum value of 20 ms (milliseconds) when the vehicle 101 speed is above, e.g., 50 mph (miles per hour), and the time threshold can be 100 ms when the vehicle 101 speed is, e.g., 10 mph.

Next, in a block 325, the computer 105 determines whether the manual steering torque input is above a first threshold. The first threshold can be a torque value selected, as described above, as predicting that the user intends to remain in the manual steering mode for the remainder of the route. If the manual steering torque input is above the first threshold, the process 300 continues in a block 345. Otherwise, the process 300 continues in a block 330.

In the block 330, the computer 105 determines whether the manual steering torque input is above a second threshold. The second threshold can be a torque value that indicates that the user intends to temporarily assert manual control of the steering and to return the steering to the autonomous steering mode. If the manual steering torque input is above the second threshold, the process 300 continues in a block 335. Otherwise, the process 300 ends.

In the block 335, the computer 105 measures an elapsed time of the manual steering torque input being above the second threshold. When the manual steering torque input is determined to be above the second threshold, the computer 105 is programmed to record a timestamp and to measure a time elapsed since the timestamp.

Next, in a block 340, the computer 105 determines whether the time elapsed is above the time threshold. As described above, the time threshold can be determined based on the vehicle 101 speed. For example, the time threshold can be inversely proportional to the vehicle 101 speed. If the time elapsed is above the time threshold, the process 300 continues in a block 345. Otherwise, the process 300 ends.

In the block 345, the computer 105 actuates the manual steering mode. As described above, the computer 105 adjusts the steering 120 based on user input to the steering wheel in the manual steering mode. The computer 105 can maintain the manual steering mode until the vehicle 101 is deactivated. Alternatively, the computer 105 can actuate the autonomous steering mode when a time elapsed in the manual steering mode exceeds a second time threshold. Following the block 345, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory including instructions executable by the processor to:
   measure a manual steering torque input;
   select a time threshold based on a vehicle speed; and
   actuate a manual steering mode of a vehicle when the manual steering torque input is below a first torque threshold and above a second torque threshold for longer than the time threshold.

2. The system of claim 1, wherein the instructions further include instructions to actuate an autonomous steering mode upon receiving user input.

3. The system of claim 1, wherein the instructions further include instructions to actuate an autonomous steering mode upon operating in the manual steering mode for longer than a second time threshold.

4. The system of claim 3, wherein the instructions further include instructions to determine a second vehicle speed and to determine the second time threshold based on the second vehicle speed.

5. The system of claim 1, wherein the instructions further include instructions to determine a second manual steering torque input in the manual steering mode and to actuate an autonomous steering mode when the second manual steering torque input is below the second torque threshold for longer than a second time threshold.

6. The system of claim 1, wherein the instructions further include instructions to determine a second manual steering torque input in the manual steering mode and to actuate an autonomous steering mode when the second manual steering torque input is below a third torque threshold for longer than a second time threshold.

7. The system of claim 1, wherein the instructions further include instructions to determine at least one of the first torque threshold and the second torque threshold based on the vehicle speed.

8. The system of claim 1, wherein the instructions further include instructions to identify the manual steering torque input based on user input to a steering wheel.

9. The system of claim 1, wherein the instructions further include instructions to actuate the manual steering mode when the manual steering torque input is above the first torque threshold.

10. The system of claim 9, wherein the instructions further include instructions to remain in the manual steering mode until the vehicle is deactivated.

11. A method, comprising:
    measuring a manual steering torque input;
    selecting a time threshold based on a vehicle speed; and
    actuating a manual steering mode of a vehicle when the manual steering torque input is below a first torque threshold and above a second torque threshold for longer than the time threshold.

12. The method of claim 11, further comprising actuating an autonomous steering mode upon receiving user input.

13. The method of claim 11, further comprising actuating an autonomous steering mode upon operating in the manual steering mode for longer than a second time threshold.

14. The method of claim 13, further comprising determining a second vehicle speed and determining the second time threshold based on the second vehicle speed.

15. The method of claim 11, further comprising determining a second manual steering torque input in the manual steering mode and actuating an autonomous steering mode when the second manual steering torque input is below the second torque threshold for longer than a second time threshold.

16. The method of claim 11, further comprising determining a second manual steering torque input in the manual steering mode and actuating an autonomous steering mode when the second manual steering torque input is below a third torque threshold for longer than a second time threshold.

17. The method of claim 11, further comprising determining at least one of the first torque threshold and the second torque threshold based on the vehicle speed.

18. The method of claim 11, further comprising identifying the manual steering torque input based on user input to a steering wheel.

19. The method of claim 11, further comprising actuating the manual steering mode when the manual steering torque input is above the first torque threshold.

20. The method of claim 19, further comprising remaining in the manual steering mode until the vehicle is deactivated.

* * * * *